United States Patent Office 3,050,271
Patented Aug. 21, 1962

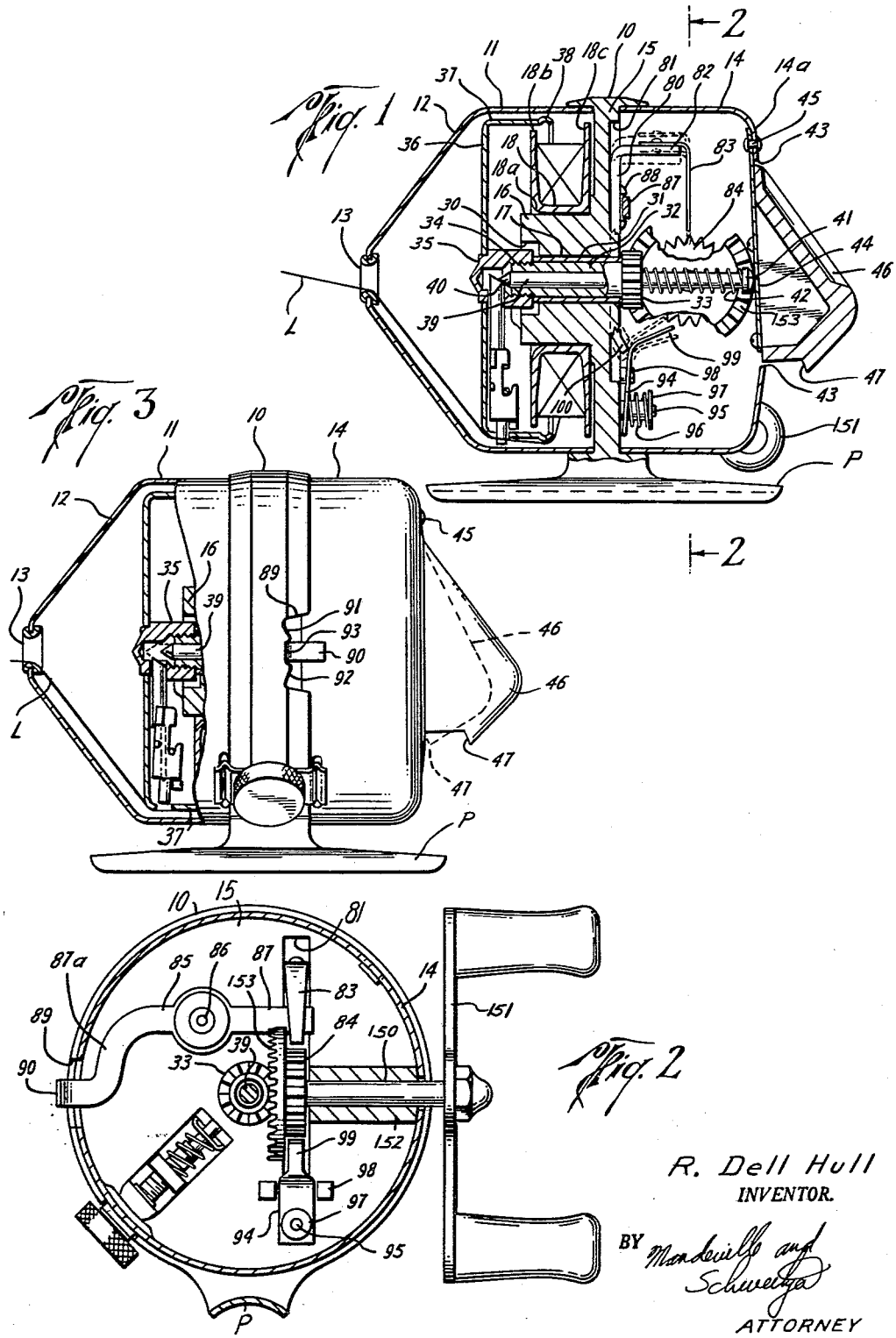

3,050,271
CLICK MEANS FOR CLOSED-FACE SPINNING REEL
R. Dell Hull, 1131 E. Easton St., Tulsa 1, Okla.
Original application Aug. 27, 1957, Ser. No. 680,501. Divided and this application Jan. 26, 1959, Ser. No. 788,814
6 Claims. (Cl. 242—84.51)

This application is a divisional of my co-pending application Serial No. 680,501, filed August 27, 1957, for "Closed-Face Spinning Reel" and now abandoned.

This invention relates to finishing reels and more particularly to improvements in spinning reels.

The present invention is directed to improvements in spinning reels of the so-called "closed-face" type. In this type of spinning reel, the line spool is enclosed within a casing normally provided with a front portion or cover, which may be of conical or concave-convex form, having a central opening or eye through which the line travels as it moves over the front face or flange of the line spool in passage to and from the spool, the line opening being ordinarily co-axial with the axis of the spool. Reels of this general type are illustrated in my U.S. Patents Nos. 2,668,025 and 2,675,192.

A primary object of the present invention is to provide a spinning reel of the general type described in which the various operating and line control elements are of improved and generally simplified design, whereby to improve the efficiency and ease of operation, and to reduce cost of construction of the reel.

A particular aspect of the invention resides in the provision of improvements in the click and anti-reverse elements of a spinning reel mechanism. In this respect, the invention provides an extremely simplified, yet wholly effective, reliable and durable click and anti-reverse mechanism, actuated by simple movements of a control bar mounted slidably in a transverse wall of the reel frame. The control bar is readily operated by a lever, pivoted on the frame wall and having a portion exposed for convenient manipulation by the user.

Other and more specific objects and advantages of this invention will become more readily apparent from the following detailed description when read in conjunction with the accompanying drawings which illustrate a useful embodiment of the improved reel structure in accordance with the present invention.

In the drawing:

FIG. 1 is a longitudinal sectional view of the reel showing the parts in the positions occupied during rewinding;

FIG. 2 is a transverse cross-sectional view taken generally along line 2—2 of FIG. 1; and FIG. 3 is an elevational view of the new reel, partly in section, illustrating the position of the pick-up elements during a cast.

The reel comprises a generally tubular casing 10 constructed of any suitable material, such as metal, plastic, or the like, and is provided with a front cover 11 insertable in the forward end portion of casing 10 and removably secured thereto in a manner to be hereinafter described. Casing 10 is provided with the usual support plate P for attaching the reel to the reel seat of a fishing rod in the usual manner. The forward portion of cover 11 is formed with a forwardly tapered conical portion 12 provided at its apex with a line guide opening 13 through which line L may pass to and from the interior of the cover. A rear cover 14 fits into the rear end portion of casing 10 and is removably secured thereto in a manner to be described subsequently. A wall 15 extends across casing 10 and has formed in the center thereof a forwardly projecting cylindrical boss 16 having an axial bore 17. A line spool 18 having an axial bore 18a and forward and rear flanges 18b and 18c, respectively, is mounted on boss 16 in front of wall 15 and is arranged for controlled rotation about boss 16, as will be more fully described hereinafter.

Rotation of spool 18 about boss 16 is controlled by a slipping clutch or drag mechanism, which forms the subject matter of my copending application Ser. No. 788,813, filed January 26, 1959, now Patent No. 2,991,957.

The forward end of bore 17 is counterbored for a short distance to provide the annular recess 30, and an antifriction bearing 31 is disposed in bore 17 and projects slightly forwardly into recess 30, as best seen particularly in FIG. 1. A tubular shaft 32 is slidably inserted in the bore of bearing 31 and is rotatable therein and carries on its rearward end a pinion 33 which is fixedly secured on the shaft and bears against the rearward end of bearing 31, which forms a stop therefor. The forward end of shaft 32 extends in front of the end of boss 16 and is reduced in diameter and is externally threaded at 34 to threadedly receive the hollow hub 35 of a circular pick-up head 36 which is secured to hub 35 and has about its outer periphery an annular flange 37 which projects rearwardly over the outer periphery of spool flange 18b to a point intermediate the spool flanges. The inner end of hub 35 when screwed on threads 34 of the shaft will extend into recess 30 and abut the forward end of bearing 31 and thereby draw pinion 33 against the rearward end of bearing 32 and hold these parts together. The rearward end of flange 37 is rounded at 38 to permit smooth passage of line L thereover in its movement to and from spool 18.

A crank shaft 150 (FIG. 2) is mounted in casing 10 at right angles to its longitudinal axis and projects radially through the wall of the casing and has mounted on its outer end a winding handle 151. The inner end of crank shaft 150 is journaled in a support bearing 152 which is supported on the rear face of wall 15. Crank shaft 150 carries on its inner end a gear 153 which is in mesh with pinion 33, whereby rotation of crank shaft 150 will rotate shaft 32 and pick-up head 36.

A cylindrical control rod 39 extends slidably through the bore of shaft 32 and through pinion 33 and projects rearwardly from the latter. The forward end of rod 39 extends into the bore of hub 35, as best seen in FIGS. 1 and 3, and has its forward end shaped to provide the forwardly tapering conical tip 40. The rearwardly projecting portion of control rod 39 extends to a point adjacent the rear wall 14a of rear cover 14 and has mounted on its rearward end a rounded head 41. A coil spring 42 is mounted about the rear portion of rod 39 and is disposed in compression between head 41 and pinion 33, thereby normally urging the control rod rearwardly in shaft 32. The rear wall 14a of cover 14 is provided with an opening 43 and a leaf spring 44 having its upper end secured to the upper edge of opening 43 at 45 depends into opening 43. The free portion of the leaf spring is adapted to be resiliently pressed against head 41 on the control rod by pressure applied through a thumb pressure plate 46 which is secured to the rear face of leaf spring 44 and is projectable therewith through opening 43. Thumb pressure plate 46 is provided with a shoulder 47 which is adapted to engage the lower edge of opening 43 to limit the inward movement of leaf spring 44. It will be understood that when pressure is applied to thumb plate 46 leaf spring 44 will push against head 41 to overcome the resistance of coil spring 42 and thus urge control rod 39 forwardly against the resistance of coil spring 42. When pressure is relieved from thumb pressure plate 46, the normal resilience of leaf spring 44 will cause the leaf spring to retract and permit coil spring 42 to urge control rod 39 to its rearward position, as best seen in FIG. 1.

The axial movements of control rod 39 are employed to actuate the line pick-up and line-feathering elements of the reel, which form the subject matter of my copending applications Ser. No. 788,889, filed January 26, 1959, and Ser. No. 680,501, filed August 27, 1957, and now abandoned.

In accordance with one aspect of the invention, the reel herein described includes improved antireverse and click mechanisms which are best seen in FIGS. 1 and 2. The click structure comprises an elongated flat bar 80 slidably mounted in a correspondingly shaped groove 81 cut or formed vertically in the rear face of wall 15. Bar 80 has its upper end turned outwardly or rearwardly to form the arm 82 to which is connected the reversely directed resilient click finger 83, the point of which extends downwardly substantially parallel to bar 80 and is adapted to be moved into and out of engagement with the teeth of a sprocket 84 which is fixed to shaft 150 behind gear 153. A flat lever 85 is pivoted to the rear face of wall 15 at 86 and has one arm 87 extending over the upper surface of bar 80 between a pair of opposing lugs 88 mounted on the upper surface of bar 80. The other arm 87a of lever 85 projects through a slot 89 in the wall of casing 10 to the exterior of the casing and is provided with a knob 90 by which the lever is moved angularly along slot 89 between three positions defined by the notches 91, 92 and 93 (FIG. 3) formed in the bottom of the slot. As shown in full lines in FIGS. 1, 2 and 3, lever 85 is in the neutral position when seated in notch 93. In this position, the free end of click finger 83 will be retracted out of contact with the teeth of sprocket 84 and thus no sound will be produced by rotation of the gears and other rotatable parts of the reel.

The antireverse elements comprise the spring pawl 94 having one end loosely secured to a post 95 mounted on the rear face of wall 15 and urged toward the wall by a coil spring 96 positioned about post 95 between a head washer 97 and the end of pawl 94. The loose fitting connection between the end of pawl 94 and post 95 permits the free end of the pawl to be moved outwardly and inwardly with respect to the rear face of wall 15 between a pair of guide blocks 98 mounted on opposite sides of slot 81 with which the pawl is aligned. The free end of the pawl has an upwardly turned spring finger 99 engageable with the teeth of sprocket 84 when the pawl is moved a sufficient distance inwardly toward wall 15. To accomplish such inward movement the lower end of bar 80 is provided with an up-turned toe 100 which, in the neutral position shown in full lines in FIGS. 1 and 2, will be sufficiently advanced to engage beneath pawl 94 (FIG. 1) and lift pawl finger 99 to a retracted position out of the path of rotation of the teeth of sprocket 84 in opposition to the pressure imposed by spring 99. When it is desired to engage click finger 83 with the sprocket, lever 85 will be moved to the position at which its outer arm 87a will be received in notch 91, thereby moving bar 80 and its attached parts downwardly to the broken line position shown below the full lines in FIG. 1. This downward movement of bar 80 will not only cause click finger 83 to engage teeth of sprocket 84 thereby producing the desired clicking sound upon rotation of the gears, as previously noted, but will also thrust toe 100 farther beneath pawl 94 and additionally urge finger 99 farther away from engagement with the teeth of sprocket 84, as shown in the broken line below finger 99 in FIG. 1. In this position the operating handle may be rotated in either direction and will produce the clicking sound since click finger 83 only will engage the sprocket teeth.

To engage the antireverse pawl, the lever 85 is swung in the opposite direction so that lever arm 87a will be seated in notch 92, which will act through arm 87 to move bar 80 upwardly to the broken line position shown above the solid line position in FIG. 1 and will, at the same time, correspondingly retract toe 100 from beneath pawl 94 allowing finger 99 to be moved under the pressure of spring 96 to a position where the end of the finger will engage the teeth of sprocket 84 and prevent rotation of the sprocket in a direction opposed by the finger, thereby preventing rotation of head 36 in the reverse direction, that is, the direction which would permit the line to be drawn off the spool. Finger 99 will, however, permit rotation in the direction for picking up the line. With the click and antireverse arrangement described, it will be seen that these elements may be actuated by simple movement of lever 85 to one of three positions readily accessible to the operator, and easily operated.

The reel also includes improved means providing easily securable and releasable connections for the front and rear covers to casing 10, which forms the subject matter of my copending application Ser. No. 789,039, filed January 26, 1959.

The reel constructed as heretofore described is relatively light in weight, comprises parts which may be easily and quickly assembled and is, therefore, quite low in cost of manufacture, and which, by reason of its novel features of construction and combination thereof as described, is exceptionally easy to use and very efficient and substantially fool-proof in operation.

It will be understood that various changes and modifications may be made in the details of the illustrative embodiment within the scope of the appended claims but without departing from the spirit of this invention.

I claim:

1. In a spinning reel of the type having a frame including a transverse wall, a rotatable shaft extending rearwardly of the wall, a winding shaft extending substantially at right angles to said rotatable shaft and having driving engagement therewith, a sprocket mounted on said winding shaft rearwardly of and substantially at right angles to the wall and rotatable with said winding shaft in accordance with rotations of said rotatable shaft, and click-like means operable with said sprocket, the improvement characterized by said wall having an elongated recess in the rear face thereof, a flat bar received in said recess in substantially flush relation to said rear face, said bar being movable along its axis in said recess, said click-like means being adapted to be operated by said bar and being adapted upon movement of the bar in said recess to be moved into and out of operative contacting relation to said sprocket, and an operating lever pivoted on said wall for movement substantially in the plane thereof and having a first portion overlying said bar in flat relation and a second portion projecting outwardly of the frame and adapted for manual engagement.

2. The reel of claim 1, in which the click-like means is a resilient clicking element carried by said bar and extending outward to said sprocket, said clicking element being adapted to be moved into and out of contacting relation to said sprocket by movement of said bar in said recess.

3. The reel of claim 1, in which the click-like means is a ratchet member adapted to be moved into and out of operative engaging relation to said sprocket, said ratchet member, when in said engaging relation preventing rotation of said sprocket in one direction.

4. The reel of claim 1, in which said click-like means includes a clicking element carried by said bar at one end thereof and a ratchet member adjacent the opposite end of the bar, said bar is adapted upon full movement in one direction to carry said clicking element into operative contacting relation to said sprocket and upon full movement in an opposite direction to effect movement of said ratchet member into operative engaging relation to said sprocket, and said sprocket, bar clicking element and ratchet member are so relatively proportioned and disposed that movement of said bar into an intermediate position in said recess causes said clicking element and ratchet member to be positioned in non-operative relation to said sprocket.

5. The reel of claim 4, in which the frame has a rearwardly extending annular flange surrounding said wall, the second portion of said operating lever projects radially beyond said flange, a cover received concentrically within said flange, and the flange having a recess therein for the accommodation of said operating lever when said cover is assembled with said frame.

6. The reel of claim 3, which includes resilient means acting on said ratchet member and urging said ratchet member toward said wall, said ratchet member having a first portion urged against the wall by said resilient means and a second portion extending away from the wall and toward said sprocket, said bar including a cam portion adapted to act in opposition to said resilient means to effect movement of said ratchet member away from said wall and into said engaging relation.

References Cited in the file of this patent

UNITED STATES PATENTS

| 2,862,679 | Denison et al. | Dec. 2, 1958 |

FOREIGN PATENTS

| 2,460 | Great Britain | 1913 |
| 228,027 | Great Britain | Jan. 29, 1925 |
| 719,041 | Great Britain | Nov. 24, 1954 |